(12) United States Patent
Keller

(10) Patent No.: US 6,568,305 B1
(45) Date of Patent: May 27, 2003

(54) METHOD FOR THE CONTINUOUS PRODUCTION OF TUBULAR BODIES

(75) Inventor: Gerhard Keller, Jongny (CH)

(73) Assignee: AISA Automation Industrielle SA, Vouvry (CH)

( * ) Notice: Subject to any disclaimer, the term of this patent is extended or adjusted under 35 U.S.C. 154(b) by 0 days.

(21) Appl. No.: 09/868,380

(22) PCT Filed: Jan. 11, 2000

(86) PCT No.: PCT/EP00/00131

§ 371 (c)(1),
(2), (4) Date: Jun. 18, 2001

(87) PCT Pub. No.: WO00/41876

PCT Pub. Date: Jul. 20, 2000

(30) Foreign Application Priority Data

Jan. 11, 1999 (DE) .......................... 199 00 670

(51) Int. Cl.[7] ................................. B26D 1/00
(52) U.S. Cl. .................. 83/13; 83/54; 156/269; 156/510
(58) Field of Search .................. 225/96, 965, 100, 225/101; 83/54, 35, 36, 13, 581; 222/94; 156/269–270, 250, 510, 201, 203; 493/269, 287, 288

(56) References Cited

U.S. PATENT DOCUMENTS

| 3,290,422 A | * | 12/1966 | Michel | |
| 3,572,220 A | | 3/1971 | Nerenberg | |
| 3,889,446 A | * | 6/1975 | Simmons et al. | 53/28 |
| 3,991,294 A | * | 11/1976 | Evans | 219/10.49 |
| 4,768,323 A | * | 9/1988 | Coutant et al. | 52/309 |
| 5,628,429 A | * | 5/1997 | Usen et al. | 222/1 |
| 5,782,384 A | * | 7/1998 | Ramom Mejia Mustafa et al. | 222/94 |
| 5,900,086 A | * | 5/1999 | Keller | 156/69 |
| 5,927,550 A | * | 7/1999 | Mack et al. | 222/94 |
| 5,954,234 A | * | 9/1999 | Connan et al. | 222/94 |
| 6,174,393 B1 | * | 1/2001 | Scheifele | 156/69 |
| 6,227,837 B1 | * | 5/2001 | Keller et al. | 425/112 |

FOREIGN PATENT DOCUMENTS

| DE | 195 22 169 | 1/1997 |
| EP | 0 117 730 | 9/1984 |
| GB | 1 491 053 | 11/1977 |
| WO | WO 98 31532 | 7/1998 |

* cited by examiner

Primary Examiner—Derris H. Banks
Assistant Examiner—Jamila Williams
(74) Attorney, Agent, or Firm—Collard & Roe, PC

(57) ABSTRACT

A method and a device for the continuous production of tubular bodies with an internal longitudinal separating wall for the production of tubes having two chambers which are separated from each other. An endless extruded tube having an internal longitudinal separating wall is produced and individual tubular bodies of a defined length are cut off by means of a cutting device and subjected to further processing. The tubular body is made from a film having a central, semicircular part and two angled lateral wings. The semicircular part is covered by a second film serving as separating wall. A transverse cutter having two rotating blades is used as cutting device. The rounded extruded tube having a longitudinal separating wall is fed between the two rotating blades after having been collapsed and oriented in such a way that the collapsed extruded tube has a central three-layered part which consists of the collapsed, oriented separating wall in the middle and an upper and lower flat tubular wall body section on either side, as well as two two-layered areas which adjoin the three-layered area on both sides. In this way each two-layered area consists of bent, superimposed tubular body wall sections.

2 Claims, 2 Drawing Sheets

METHOD FOR THE CONTINUOUS PRODUCTION OF TUBULAR BODIES

CROSS REFERENCE TO RELATED APPLICATIONS

Applicants claim priority under 35 U.S.C. §119 of German Application No. 199 00 670.9, filed on Jan. 11, 1999. Applicants also claim priority under 35 U.S.C. §120 of PCT/EP00/00131, filed on Jan. 11, 2000. The international application under PCT article 21(2) was not published in English.

The invention relates to a process for the continuous production of tubular bodies with an internal longitudinal separating wall for producing tubes with two chambers which are separated from one another, an endless line of tubing with internal longitudinal separating wall being produced, from which individual tubular bodies with a predetermined length are cut for further processing by means of a cutting device, and a device for carrying out the process.

Such a process is known from DE-A1-195 22 169, wherein the tubular bodies cut to the desired length are secured to a tube head by a separating wall.

In order to produce tubes without a separating wall it is known to cut the tube length desired in each case by means of a transverse cutter between two rotating blades, wherein the rotational speed can be adjusted in such a way that tubular bodies of any length, and in a wide range can be cut.

Problems occur when using such transverse cutters for lines of tubing with internal separating wall, the separating wall preferably extending in the region of the diameter, because, owing to the flattening of the line of tubing for the cut, instead of the usual two bends in the edge region, six bends are made as a result of the separating wall corresponding approximately to the diameter which is short in comparison with the flattened wider tubular wall sections which form unfavourable preconditions for further processing. For example, owing to flattening the internal separating wall is pulled strongly and there is the danger that the connecting seam may become detached from the tubular body, which would damage the tightness of the chambers. The appearance of the tube is also affected by a plurality of bends.

The object of the invention is to improve a process of the type mentioned at the outset so tubular bodies with an internal longitudinal separating wall can also be cut to any length by a cutting device without making additional bends and without causing any damage, and to provide a device for carrying out the process.

This object is achieved by a process with the features of claim 1 and by a device with features of claim 2. The invention will be described in more detail below with the aid of an embodiment and with reference to the drawings, in which:

Figure 1:
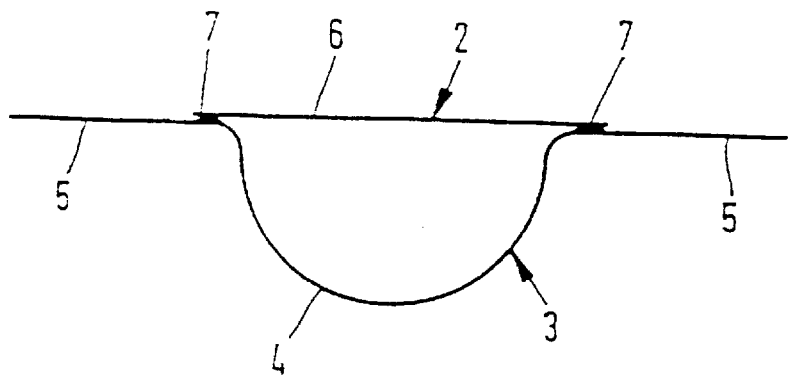
FIG. 1 shows half a tubular body with secured separating wall in cross-section.
Figure 2:
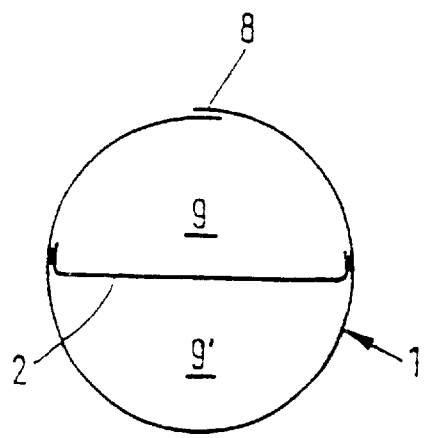
FIG. 2 shows a tubular body with internal longitudinal separating wall in cross-section.

FIG. 1 shows half a tubular body 1 with separating wall 2 in cross-section which comprises a film 3 with a central semicircular part 4 and two bent lateral wings 5, the semicircular part 4 being covered by a second film 6 which later serves as separating wall 2. The edges 7 of the second film 6 are secured directly onto the region of the lateral wings 5 adjoining the semicircular part 4 so as to be sealed. The free ends of the lateral wings 5 are connected to one another in a second stage by producing an overlapping seam 8, whereby a tubular body 1 with internal separating wall 2 arranged along its diameter is formed, the cross-section of which is shown in FIG. 2.

The tubular body is divided into two chambers (9, 9') of equal size by the separating wall 2.

Figure 4:
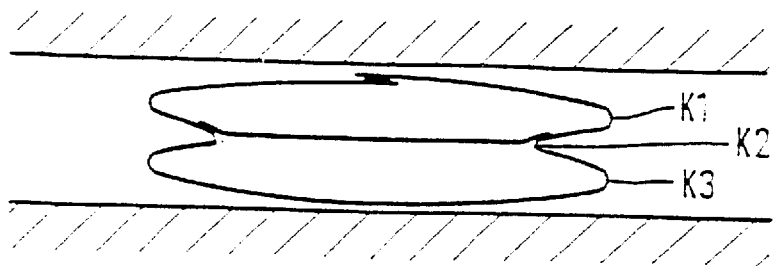
FIG. 4 shows the cutting position of a tubular body with internal separating wall in a conventional use of a transverse cutter according to the state of the art.

If a line of tubing produced in such a way is now cut to length in a known manner in a transverse cutter, for which purpose it must be flattened, the cutting position shown in FIG. 4 with three bends K1, K2, K3 on either side would be produced which could have the above-described negative consequences.

FIG. 3 shows a solution according to the invention.

Figure 3A:
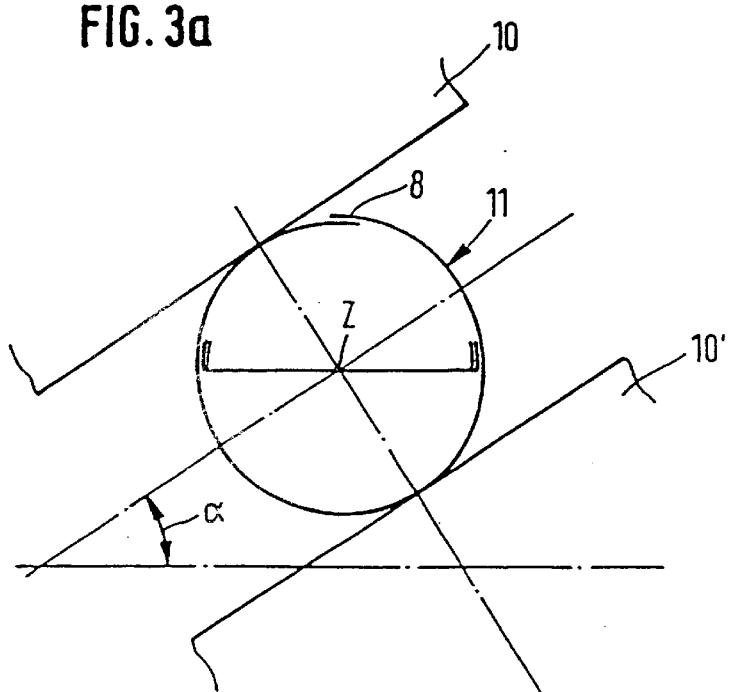
FIG. 3a shows the position of a tubular body with internal separating wall between two rotating blades of a transverse cutter.

FIG. 3a shows the opposing positions of the rotating blades 10, 10' of a transverse cutter oriented with respect to a line of tubing 11 with a horizontal separating wall 2 which divides it symmetrically. Here, the blades 10, 10' are rotated about the angle α in relation to the horizontal separating wall 2 about the central axis Z of the, in this case, rounded tubular body 1 and locked. In the given circumstances, the angle a is 32.66°. It is also possible to arrange the blades horizontally and to feed the tubular body 1 rotated about the angle a to the blades (not shown).

Figure 3B:
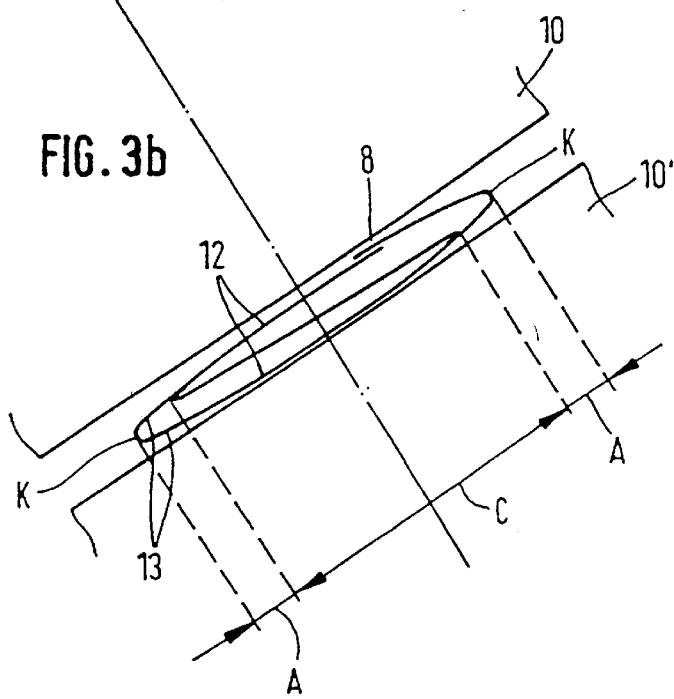
FIG. 3b shows the flattened position of the tubular body with internal separating wall immediately prior to a cut.

FIG. 3b shows the flattened line of tubing immediately prior to a cut, wherein it [has] a central three-layered region C which consists of the flattened separating wall 2 and a overlying and underlying wall section 12, 12' in each case and two two-layered regions A, A' adjoining both ends of the region C which consist solely of bent (U-shaped) superimposed wall sections 13, 13'. It is clear from this figure that, in this case, only one bend K is produced on either side as is also the case in a tubular body without a separating wall. Any single or multi-layer plastics material films with and without blocking layers made of plastics material, aluminium or glass can be used. All round or rounded, for example oval, tubular bodies with a separating wall can be used, the width of which is smaller than that of the flattened tubular body.

What is claimed is:

1. A process for producing tubular bodies from an endless line of tubing having an internal longitudinal separating wall to form two chambers separated from one another, said method comprising:

forming said line of tubing from a film having a central semicircular part and two bent lateral wings, said semicircular part being covered by a second film serving as the separating wall; and cutting said line of tubing to form tubular bodies of a predetermined length with a transverse cutter having two rotating blades, by feeding the line of tubing between the two rotating blades so as to be flattened and oriented in such a way that the flattened tubing has a central three-layered region consisting of the separating wall in a center region and a flat overlying and a flat underlying wall section, and two two-layered regions adjoining the three-layered region on either side, each two layered region consisting of bent, superimposed tubular body wall sections.

2. A device for producing tubular bodies from an endless line of tubing having an internal longitudinal separating wall to that said tubular bodies have two chambers separated from one another, said device comprising a transverse cutter having two rotating cutting blades, such that the line of tubing is fed between the two rotating blades so as to be flattened and oriented in such a way that the flattened tubing has a central three-layered region consisting of the flat separating wall in a center and a flat overlying and a flat underlying wall section, and two two-layered regions adjoining the three-layered region on either side, each two layered region consisting of bent, superimposed tubular body wall sections, wherein the rotating blades have parallel axes.of rotation between which the line of tubing is fed, and wherein said parallel axes of rotation are arranged about a central axis of the line of tubing so as to be jointly rotatable and lockable during cutting.

* * * * *